(12) United States Patent
Kataoka (10) Patent No.: US 6,765,371 B2
(45) Date of Patent: Jul. 20, 2004

(54) NON-ISOLATED DC-DC CONVERTER FOR PERFORMING DIRECT CURRENT POWER CONVERSION

(75) Inventor: Kenji Kataoka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/213,088

(22) Filed: Aug. 7, 2002

(65) Prior Publication Data

US 2003/0042880 A1 Mar. 6, 2003

(30) Foreign Application Priority Data

Aug. 29, 2001 (JP) ........................................ 2001-260024

(51) Int. Cl.$^7$ .............................................. G05F 1/613
(52) U.S. Cl. ...................... 323/222; 323/271; 323/284; 323/901
(58) Field of Search ................................ 323/222, 223, 323/224, 225, 271, 282, 284, 901

(56) References Cited

U.S. PATENT DOCUMENTS

| | | | | |
|---|---|---|---|---|
| 5,233,508 A | * | 8/1993 | Yamamura et al. | 323/901 |
| 5,552,695 A | * | 9/1996 | Schwartz | 323/271 |
| 5,627,460 A | * | 5/1997 | Bazinet et al. | 323/224 |
| 5,889,392 A | * | 3/1999 | Moore et al. | 323/282 |
| 5,982,160 A | * | 11/1999 | Walters et al. | 323/222 |
| 5,998,977 A | | 12/1999 | Hsu et al. | 323/272 |
| 6,346,798 B1 | * | 2/2002 | Passoni et al. | 323/282 |
| 6,522,113 B1 | * | 2/2003 | Betten | 323/282 |
| 6,583,609 B1 | * | 6/2003 | Pardoen | 323/284 |
| 2001/0004205 A1 | | 6/2001 | Miller | 323/224 |

FOREIGN PATENT DOCUMENTS

| | | | | |
|---|---|---|---|---|
| EP | 0 532 263 A1 | 3/1993 | .......... | H02M/3/158 |
| JP | A 05-076167 | 3/1993 | .......... | H02M/3/155 |
| JP | A 11-220874 | 8/1999 | .......... | H02M/3/155 |
| JP | A 2000-333445 | 11/2000 | .......... | H02M/3/155 |
| JP | A 2001-128369 | 5/2001 | ............. | H02J/7/00 |

* cited by examiner

Primary Examiner—Jeffrey Sterrett
(74) Attorney, Agent, or Firm—Oliff & Berridge, LLC

(57) ABSTRACT

In a non-insulated DC—DC converter for performing direct-current power conversion by operating a first MOS transistor and a second MOS transistor in mutually inverted phases, the second MOS transistor is held off during soft-start control. In soft-start control, the on-duty period of the first MOS transistor is short immediately after the switch-on of a power source, and is gradually extended afterwards.

12 Claims, 7 Drawing Sheets

NON-ISOLATED DC-DC CONVERTER FOR PERFORMING DIRECT CURRENT POWER CONVERSION

INCORPORATION BY REFERENCE

The disclosure of Japanese Patent Application No. 2001-260024 filed on Aug. 29, 2001 including the specification, drawings and abstract is incorporated herein by reference in its entirety.

BACKGROUND OF THE INVENTION

1. Field of the Invention

The present invention relates to a non-isolated DC—DC converter for performing direct-current power conversion. In particular, the invention relates to a DC—DC converter suited to be connected on both input and output sides to charge/discharge units such as a battery and a capacitor.

2. Description of the Related Art

Japanese Patent Application Laid-Open No. 2001-128369 discloses a DC—DC converter that is used in a state of being connected on both input and output sides to charge/discharge means. The DC—DC converter disclosed in this publication has two switching elements (MOS transistors having body diodes) connected to a reactor, and performs direct-current power conversion by holding one of the MOS transistors off and driving the other MOS transistor in an on/off manner. By interchanging the MOS transistor to be held off and the MOS transistor to be driven in an on/off manner, power can be charged in a bidirectional manner.

The DC—DC converter disclosed in this publication is advantageous in that power can be charged in a bidirectional manner. However, since the DC—DC converter is operated such that one of the MOS transistors is always held off, a current flows through a corresponding one of the body diodes in the normal direction. As a result, a problem is caused in respect of losses in the diode. For this reason, it is difficult to employ this DC—DC converter in a power circuit or the like in which losses in a diode raise a problem.

As a solution to such a problem, a DC—DC converter of the synchronous rectification control type in which two MOS transistors are operated in mutually inverted phases has been available as a non-insulated DC—DC converter designed to achieve the enhancement of efficiency by reducing losses in a diode.

On the other hand, such a non-insulated DC—DC converter is generally designed to perform soft-start control so as to prevent an overcurrent from flowing through an MOS transistor that is driven to be turned on at the beginning of an operation. According to soft-start control, the on-duty period is set short at first, is gradually extended afterwards, and reaches a desired period eventually.

However, if the DC—DC converter of synchronous rectification control type is connected on the output side to a power source, the on-duty period of the other MOS transistor is extended during soft-start control. As a result, an overcurrent flows through this MOS transistor. This is a contradiction to the original purpose of soft-start control. If an overcurrent flows through an MOS transistor, the MOS transistor may be destructed.

SUMMARY OF THE INVENTION

It is the object of the invention to improve a non-insolated DC—DC converter prevent in such a way that an overcurrent is prevented from flowing through a switching element during soft-start control.

The DC—DC converter according to the invention is a non-insulated DC—DC converter that comprises at least two switching elements connected to a coil and that is designed to perform direct-current power conversion by operating the at least two switching elements in mutually inverted phases by means of a control circuit. In order to solve the aforementioned problem, the control circuit performs soft-start control for gradually increasing an on-duty period of one of the switching elements at the beginning of an operation and holds the other switching element off during soft-start control.

The on-duty period of one of the switching elements is shorter during soft-start control than in a steady state. Besides, the other switching element is held off while soft-start control is performed. Thus, neither of the switching elements allows passage of an overcurrent.

Furtheron, the DC—DC converter may be so connected as to be located between a first charge/discharge unit and a second charge/discharge unit and may be designed to supply direct-current power from one of the charge/discharge units to the other. This DC—DC converter may be designed as follows. The switching elements include a first switching element and a second switching element. The first switching element is connected at one end to the first charge/discharge unit and at the other end to one end of the second switching element and one end of the coil. The coil is connected at the other end to the second charge/discharge unit.

If the DC—DC converter is thus configured, both step-up conversion and step-down conversion can be realized by suitably controlling the duty ratio at which a corresponding one of the switching elements is driven in an on/off manner.

Alternatively, the DC—DC converter may be so connected as to be located between a first charge/discharge unit and a second charge/discharge unit and may be designed to supply direct-current power from one of the charge/discharge units to the other. This DC—DC converter may be designed as follows. The first switching element is connected at one end to the first charge/discharge unit and at the other end to one end of the second switching element and one end of the coil. The coil is connected at the other end to one end of a third switching element and one end of a fourth switching element. The third switching element is connected at the other end to the second charge/discharge unit. The control circuit operates the fourth switching element in the same phase as the first switching element and operates the second and third switching elements in mutually inverted phases. At least one of the second and third switching elements is held off while soft-start control for gradually increasing an on-duty period of the first and fourth switching elements is performed at the beginning of an operation. At least one of the first and fourth switching elements is held off while soft-start control for gradually increasing an on-duty period of the second and third switching elements is performed at the beginning of an operation.

This DC—DC converter makes it possible to perform step-up conversion and step-down conversion in a bidirectional manner.

DETAILED DESCRIPTION OF PREFERRED EMBODIMENTS

Figure 1:
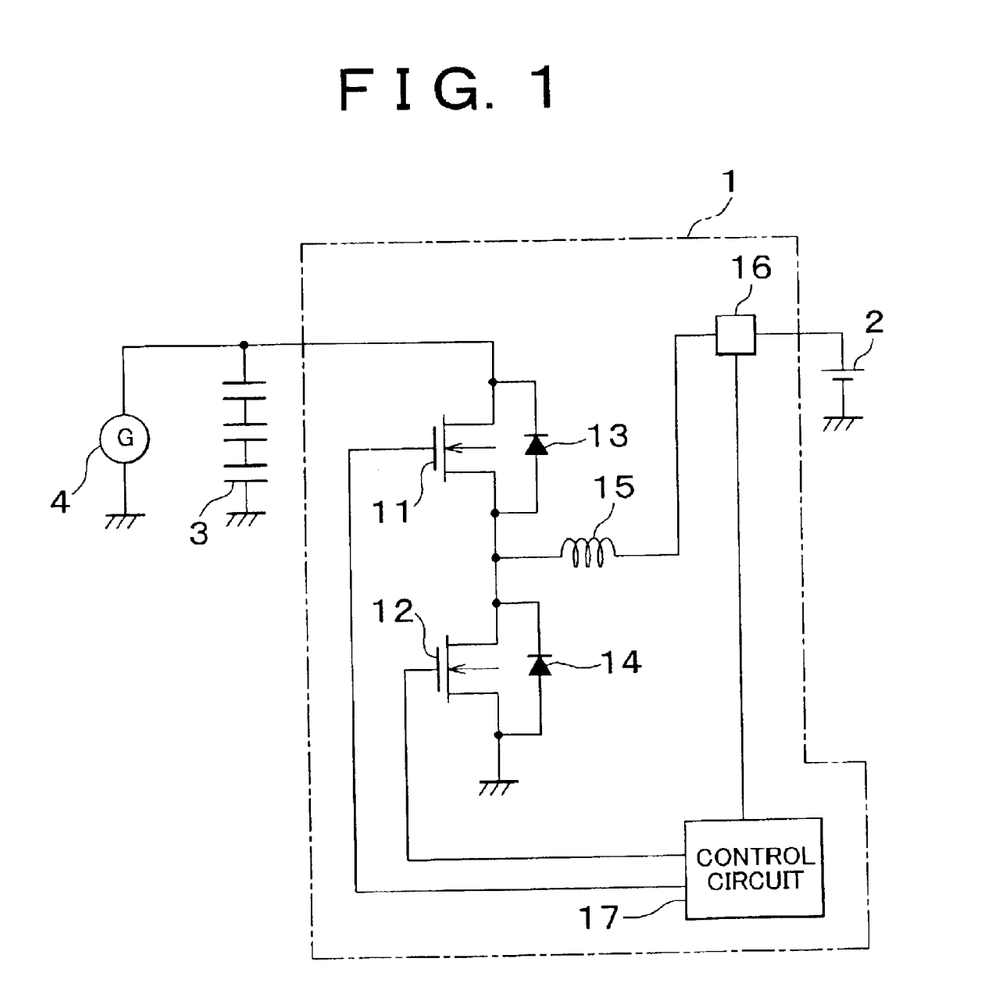
FIG. 1 is a circuit diagram of a step-down DC—DC converter according to a first embodiment of the invention.

FIG. 1 is a block diagram of a DC—DC converter according to a first embodiment of the invention. A DC—DC converter 1 is a step-down converter that is installed in an automobile as part of a power circuit. The DC—DC converter 1 is disposed between two charge/discharge units 3, 2, which are also installed in the automobile.

The charge/discharge unit 3 is a capacitor for temporarily storing regenerative power that is generated by a generator 4 when the automobile slows down or draws up. In accordance with the amount of electric charges stored in the capacitor, the voltage applied thereto changes between 0V and 40V. The charge/discharge unit 2 is a battery with a voltage of 12V. Power obtained from the battery is used to drive auxiliaries of the automobile, such as lights and an air-conditioner. The capacitor 3 has a smaller storage capacitance than the battery 2.

While the capacitor 3 is located on the input side of the DC—DC converter 1, the battery 2 is located on the output side of the DC—DC converter 1. The DC—DC converter 1 is designed to reduce a voltage applied to the capacitor 3 and supply power to the battery 2. The DC—DC converter 1 includes a first MOS transistor 11 and a second MOS transistor 12 as switching elements. The first MOS transistor 11 and the second MOS transistor 12 are equipped with a body diode 13 and a body diode 14 respectively.

The first MOS transistor 11 and the second MOS transistor 12 are connected in series and constitute a series circuit. This series circuit is connected on the side of the first MOS transistor 11 to the capacitor 3 and grounded on the side of the second MOS transistor 12. A coil 15 with a reactance L is connected at one end to a junction of the first and second MOS transistors 11, 12, and at the other end to the battery 2. A current sensor 16 for detecting an output current $I_{out}$ is disposed between the coil 15 and the battery 2.

A control circuit 17 performs on/off control of the first MOS transistor 11 and the second MOS transistor 12. In a steady state, the control circuit 17 performs synchronous rectification control for operating the first MOS transistor 11 and the second MOS transistor 12 in mutually inverted phases. A duty ratio γ of the first MOS transistor 11 is controlled such that an equation (1) shown below is satisfied.

γ=output voltage/input voltage        (1)

Due to this switching control, power stored in the capacitor 3 is converted in a step-down manner and supplied to the battery 2.

At the beginning of an operation, the control circuit 17 performs soft-start control instead of normal on/off control.

Figure 2A:
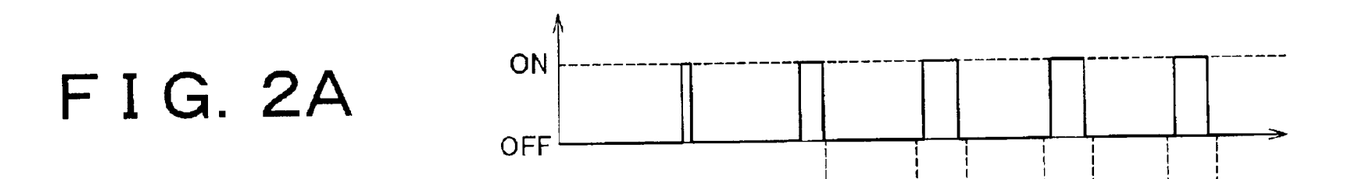
FIGS. 2A–2C include timing charts showing how the DC—DC converter according to the first embodiment operates.
Figure 2B:
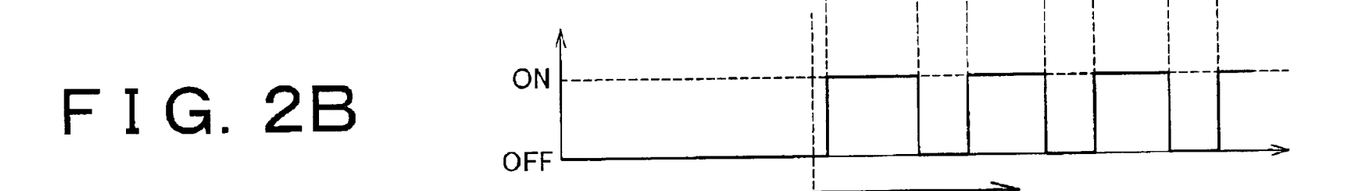
Figure 2C:
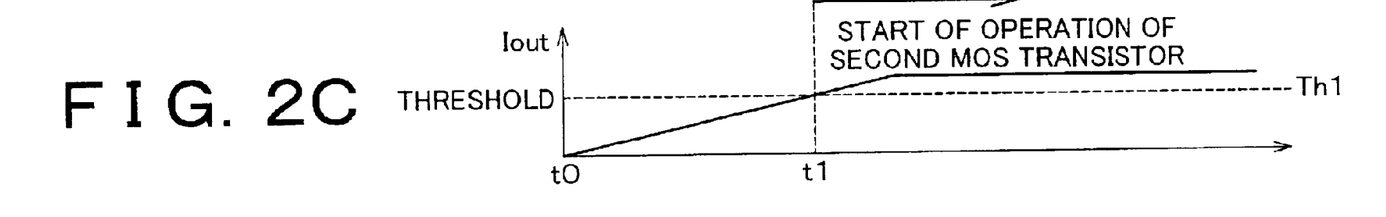

FIG. 2 includes timing charts for explaining soft-start control of this embodiment. FIG. 2A is a timing chart showing a switching operation of the first MOS transistor 11. FIG. 2B is a timing chart showing a switching operation of the second MOS transistor 12. FIG. 2C is a timing chart showing an output current $I_{out}$ detected by the current sensor 16.

As shown in FIG. 2A, on/off control of the first MOS transistor 11 is started at a timing t0. At first, an on-duty period of the first MOS transistor 11 during on/off control is much shorter than an on-duty period during a steady state, which is determined by the duty ratio γ calculated on the basis of the equation (1), that is, γ = output voltage/input voltage = (voltage applied to the battery 2)/

(voltage applied to the capacitor 3).

The on-duty period is gradually extended afterwards.

In a device of the prior art, if the first MOS transistor 11 is subjected to such soft-start control, the on-duty period is very long at first, because the second MOS transistor 12 is operated in an inverted phase with respect to the first MOS transistor 11.

However, since the battery 2 is located on the output side, a current I indicated by an equation (2) shown below flows from the battery 2 to the second MOS transistor 12 via the coil 15 if the second MOS transistor 12 is turned on at the beginning of the operation.

$$I = \frac{1}{L}\int V dt \qquad (2)$$
$$= \frac{1}{L} V \cdot Ton$$

In this equation, L, V, and $T_{on}$ represent a reactance of the coil 15, a voltage applied to the battery 2, and an on-duty period of the second MOS transistor 12, respectively.

As is apparent from the equation (2), the on-duty period of the second MOS transistor 12 is extended immediately after the operation is started, and as a result, an overcurrent flows through the second MOS transistor 12. In particular, if the reactance L is set small with the intention of making the DC—DC converter compact as a whole, the overcurrent is further increased and could cause destruction of elements.

However, according to this embodiment, the second MOS transistor 12 is held off during soft-start control as shown in FIG. 2B. Therefore, no overcurrent resulting from the battery 2 flows through the second MOS transistor 12.

While the second MOS transistor 12 is off, a current flows through a body diode 14 in a forward direction in accordance with a switching operation of the first MOS transistor 11, whereby step-down conversion is performed.

By performing this soft-start control, the output current $I_{out}$ detected by the current sensor 16 is increased gradually as shown in FIG. 2C. When the output current $I_{out}$ exceeds a preset threshold Th1 (at a timing t1), the control circuit 17 stops soft-start control and switches to normal synchronous rectification control. That is, the on-duty period of the first MOS transistor 11 is switched to the on-duty period during a steady state, which is determined by the duty ratio γ calculated on the basis of the equation (1). Also, the second MOS transistor 12 is inverted in phase with respect to the first MOS transistor 11. Once the steady state is established, the on-duty period of either of the MOS transistors is prevented from being extended extremely.

When the first and second MOS transistors 11, 12 are turned on or off, a dead time of, for example, about 0.1 μm is set so as to prevent both the first and second MOS transistors from being turned on simultaneously.

Figure 3:
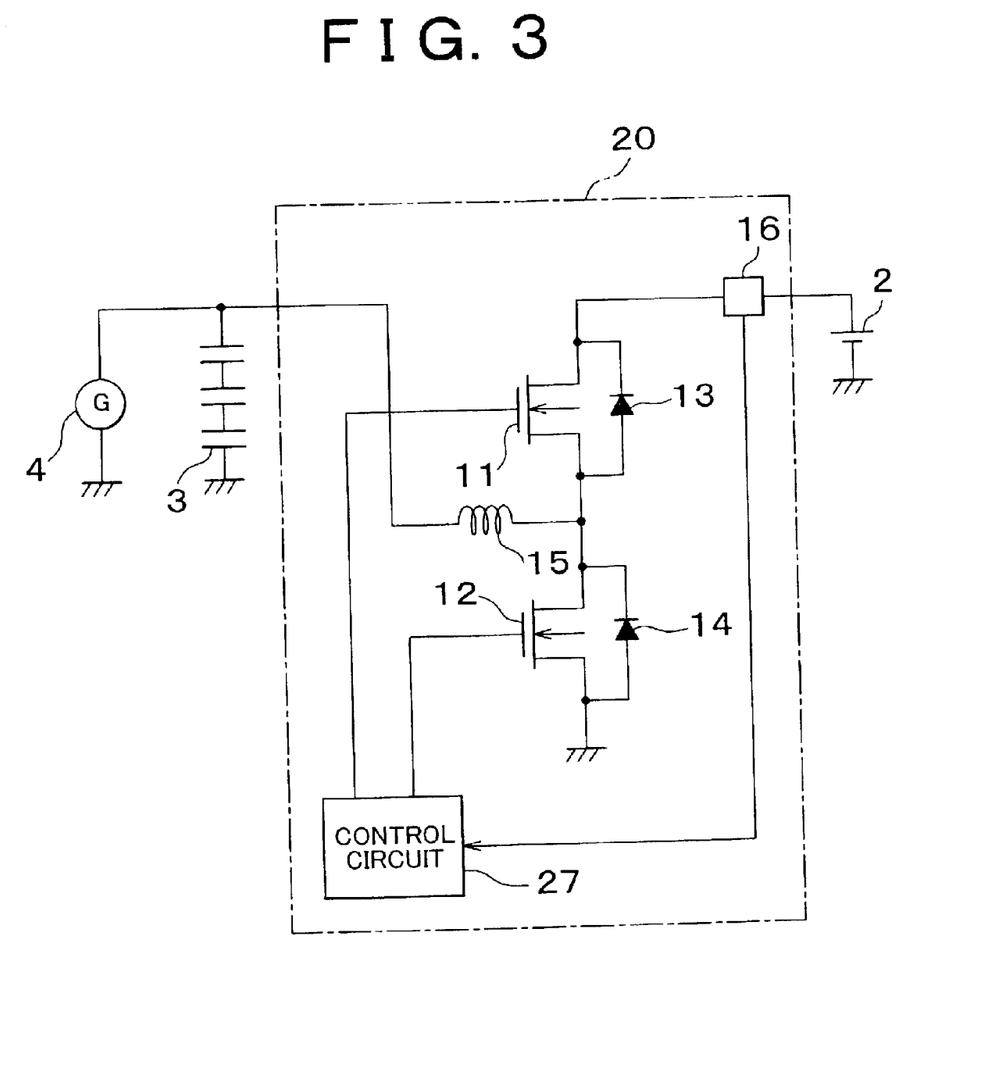
FIG. 3 is a circuit diagram of a step-up DC—DC converter according to a second embodiment of the invention.
Figure 4A:
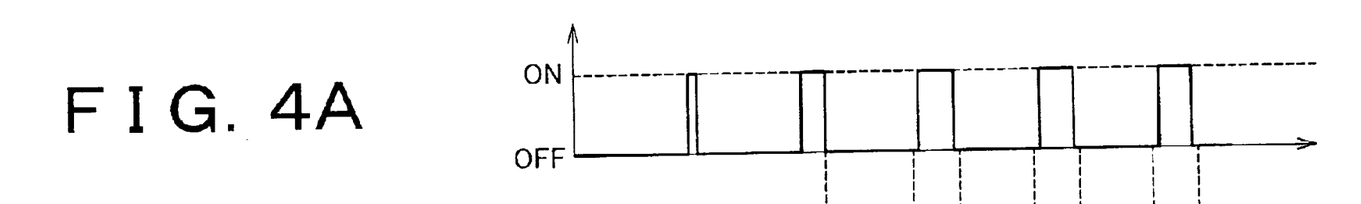
FIGS. 4A–4C include timing charts showing how the DC—DC converter according to the second embodiment operates.
Figure 4B:
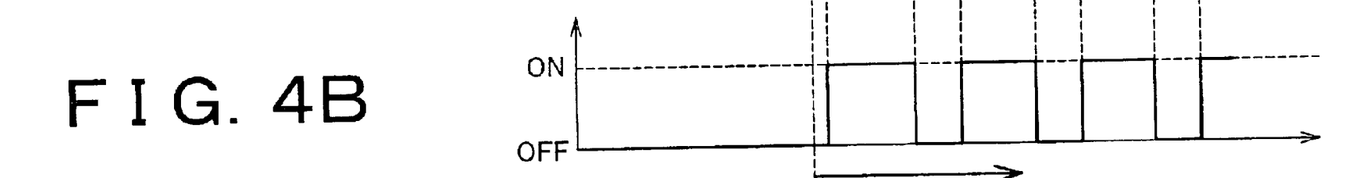
Figure 4C:
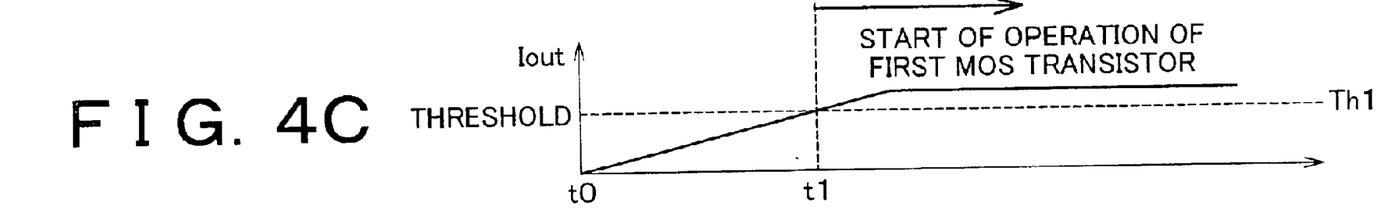

A DC—DC converter for step-up conversion according to a second embodiment of the invention will now be described. FIG. 3 is a circuit diagram showing the configuration of the DC—DC converter. FIG. 4 is a timing chart showing how the DC—DC converter operates.

In FIG. 3, the component members identical or similar to those shown in FIG. 1 are denoted by the same reference numerals and will not be described again in any further detail.

The second embodiment is the same as the first embodiment shown in FIG. 1 in that electric charges stored in the capacitor 3 are subjected to voltage conversion and supplied to the battery 2. However, while the first embodiment deals with the DC—DC converter for step-down conversion, the second embodiment deals with the DC—DC converter for step-up conversion.

The voltage applied to the capacitor 3 changes in accordance with the amount of electric charges stored therein. Therefore, if sufficient regenerative energy cannot be obtained from the generator 4, the voltage applied to the capacitor 3 drops gradually and may become lower than 12V, which is a voltage applied to the battery 2. In such a case, it is necessary to supply the battery 2 with power stored in the capacitor 3 with the aid of step-up conversion. A DC—DC converter 20 is employed on such an occasion.

The DC—DC converter 20 performs a switching operation by means of a control circuit 27 such that the duty ratio γ of the second MOS transistor 12 satisfies an equation (3) shown below.

$$\text{output voltage/input voltage} = 1/(1-\gamma) \tag{3}$$

At the same time, the DC—DC converter 20 performs the switching operation such that the first MOS transistor 11 is inversed in phase with respect to the second MOS transistor 12. If a power source is turned on, the DC—DC converter 20 performs soft-start control such that the on-duty period of the second MOS transistor 12 is short at first and is increased gradually and that the first MOS transistor 11 is held off.

FIG. 4 includes timing charts showing how soft-start control is performed. FIG. 4A shows how the second MOS transistor 12 is switched. FIG. 4B shows how the first MOS transistor 11 is switched. FIG. 4C shows the output current $I_{out}$ detected by the current sensor 16.

If the DC—DC converter 20 starts operating at the timing t0, soft-start control is first performed as in the case of the first embodiment. In the second embodiment, on/off control of the second MOS transistor 12 is started as shown in FIG. 4A. The first MOS transistor 11 is held off as shown in FIG. 4B. At the timing t1 at which the output current $I_{out}$ exceeds the threshold Th1, soft-start control is replaced by normal synchronous rectification control.

In this embodiment as well, the first MOS transistor 11 is held off while the second MOS transistor 12 is subjected to soft-start control. Therefore, no overcurrent flows through the first MOS transistor 11.

Figure 5:
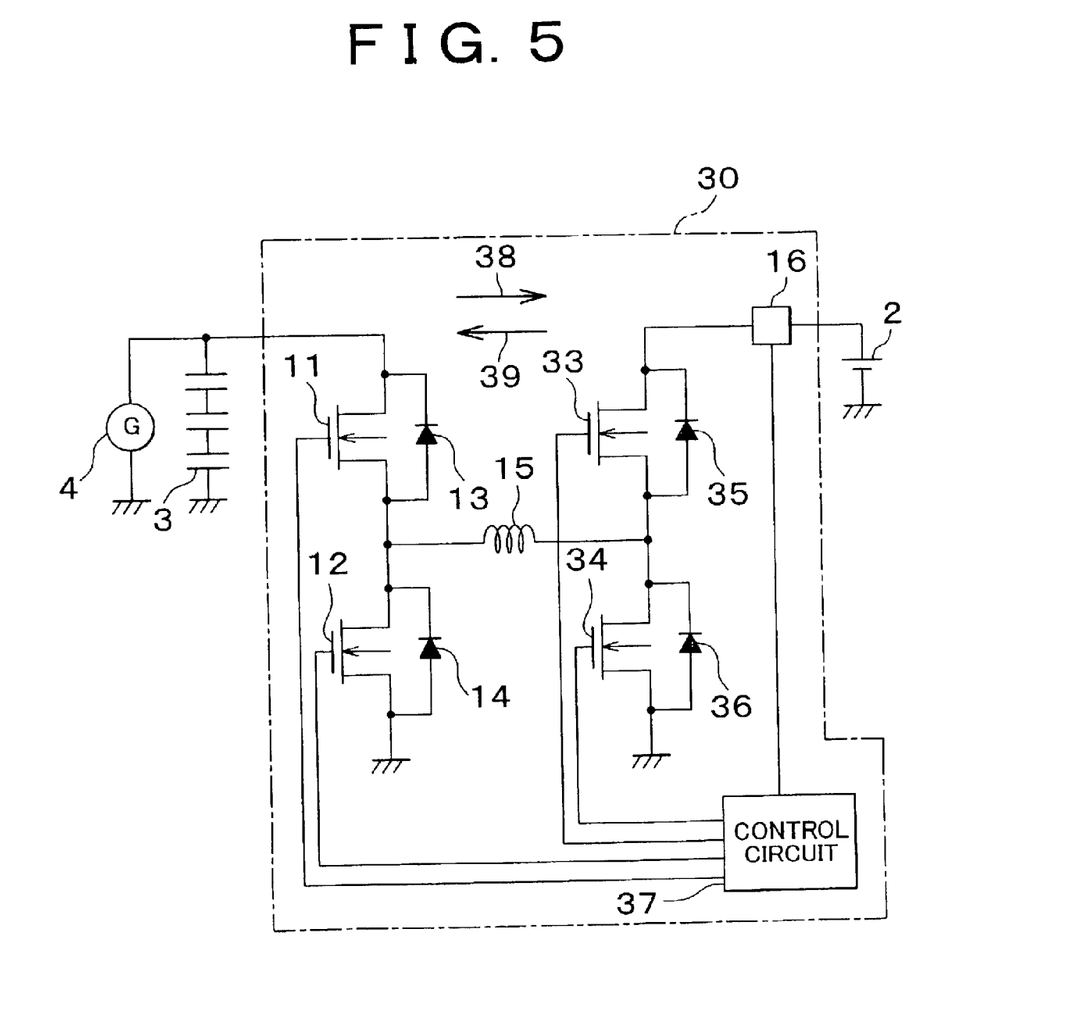
FIG. 5 is a circuit diagram of a bidirectional DC—DC converter according to a third embodiment of the invention.

FIG. 5 is a circuit diagram of a bidirectional DC—DC converter according to a third embodiment of the invention. As shown in FIG. 5, a DC—DC converter 30 has four MOS transistors 11, 12, 33, and 34. The first MOS transistor 11 is connected at one end to the capacitor 3, and at the other end to one end of the second MOS transistor 12 and an upper end of the coil 15. The coil 15 is connected at the other end to one end of the third MOS transistor 33 and one end of the fourth MOS transistor 34. The third MOS transistor 33 is connected at the other end to the battery 2. The third MOS transistor 33 and the fourth MOS transistor 34 are equipped with a body diode 35 and a body diode 36 respectively.

Such a configuration makes it possible to perform step-up conversion and step-down conversion, whether power is supplied in the normal direction from the capacitor 3 to the battery 2 as indicated by an arrow 38 or in the reverse direction from the battery 2 to the capacitor 3 as indicated by an arrow 39.

It will be described first of all how power is supplied in the normal direction (as indicated by the arrow 38), with reference to timing charts shown in FIG. 6. In the case of the operation in the normal direction, the first and fourth MOS transistors 11, 34 are subjected to on/off control such that the duty ratio γ satisfies an equation (4) shown below.

$$\text{output voltage/input voltage} = \gamma/(1-\gamma) \tag{4}$$

At the same time, the second and third MOS transistors 12, 33 are subjected to on/off control such that the duty ratio γ becomes an inverse of the value satisfying the equation (4). Thus, it becomes possible to perform step-up conversion and step-down conversion in the normal direction.

At the beginning of the operation, the first and fourth MOS transistors 11, 34 are subjected to soft-start control.

Figures 6A, 6B, 6C, 6D:
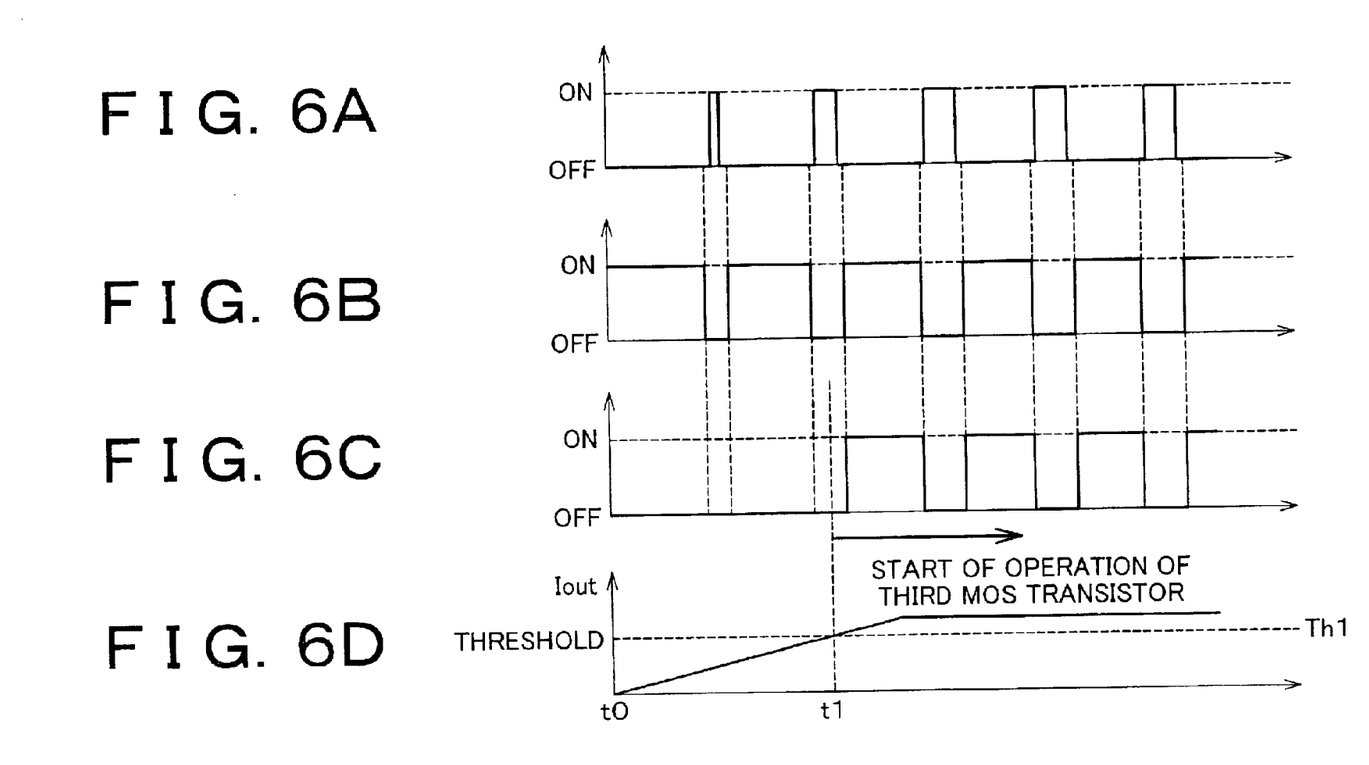
FIGS. 6A–6D include timing charts showing how the DC—DC converter according to the third embodiment operates in the normal direction.

FIG. 6 includes timing charts for explaining soft-start control in the case of conversion in the normal direction. FIG. 6A shows how the first and fourth MOS transistors 11, 34 are switched. FIG. 6B shows how the second MOS transistor 12 is switched. FIG. 6C shows how the third MOS transistor 33 is switched. FIG. 6D shows the output current $I_{out}$ detected by the current sensor 16.

As in the case of the first and second embodiments, soft-start control is performed from the timing t0 to the timing t1 at which the output current $I_{out}$ exceeds the threshold Th1, and normal synchronous rectification control is performed afterwards.

If the second and third MOS transistors 12, 33 are driven in mutually inverted phases as in the case of normal synchronous rectification control while the first and fourth MOS transistors 11, 34 are subjected to soft-start control, an overcurrent flows from the battery 2 through the third MOS transistor 23, the coil 15, and the second MOS transistor 12.

However, according to this embodiment, the third MOS transistor 33 is held off as shown in FIG. 6C during soft-start control of the first and fourth MOS transistors 11, 34. Thus, it is possible to prevent an overcurrent from flowing through the second and third MOS transistors 12, 33.

FIG. 7 includes timing charts for explaining soft-start control in the case of conversion in the reverse direction. FIG. 7A shows how the second and third MOS transistors 12, 33 are switched. FIG. 7B shows how the fourth MOS transistor 34 is switched. FIG. 7C shows how the first MOS transistor 11 is switched. FIG. 7D shows the output current $I_{out}$ detected by the current sensor 16. It is to be noted herein that the current sensor 16 is located on the input side in the case of conversion in the reverse direction and thus does not detect output current directly. However, since the value detected by the current sensor 16 substantially represents the output current, the current sensor 16 can be used to detect output current.

As in the case of conversion in the normal direction, soft-start control is performed from the timing t0 to the timing t1 at which the output current $I_{out}$ exceeds the threshold Th1, and normal synchronous rectification control is performed afterwards.

Figure 7A:
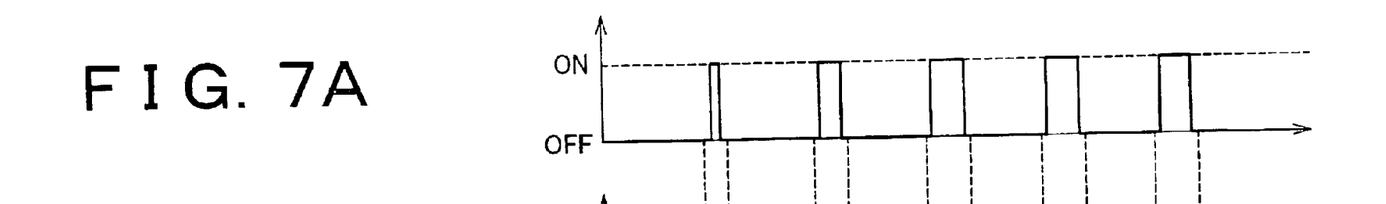
FIGS. 7A–7D include timing charts showing how the DC—DC converter according to the third embodiment operates in the reverse direction.
Figure 7B:
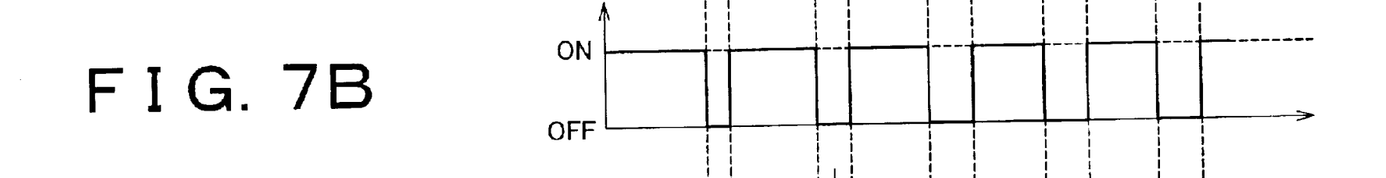
Figure 7C:
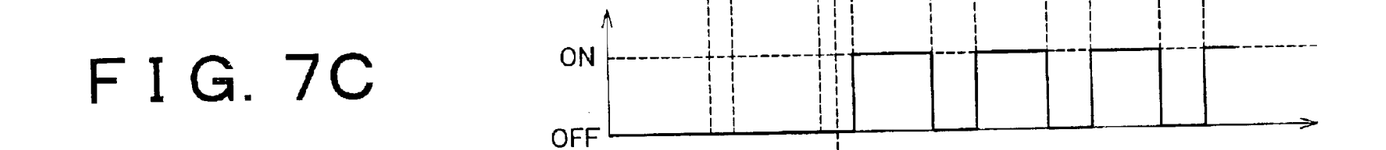
Figure 7D:
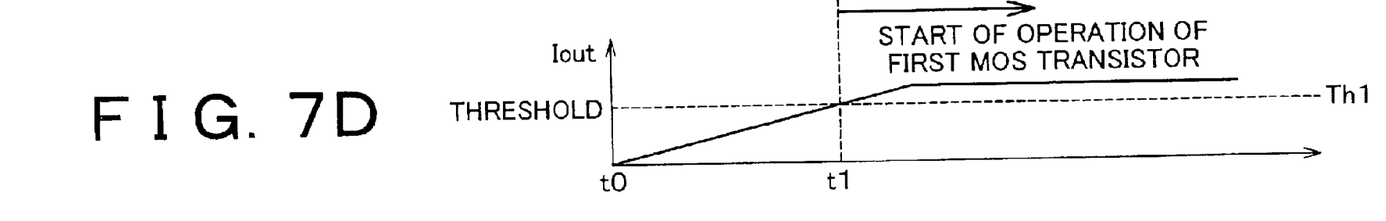

The first MOS transistor 11 is held off during soft-start control of the second and third MOS transistors 12, 33. Thus, it is possible to prevent an overcurrent from flowing through the first and fourth MOS transistors 11, 34.

What is claimed is:

1. A control method for a non-isolated DC—DC converter comprising at least two switching elements connected to a coil and a control circuit for performing direct-current power conversion by operating the at least two switching elements in mutually inverted phases, the method characterized by comprising the steps of:

performing soft-start control for gradually increasing an on-duty period of one of the switching elements at the beginning of an operation;

holding the other switching element off during soft-start control;

the soft-start control is terminated after a current flowing through a junction of the DC—DC converter with the first or second charge/discharge unit has exceeded a predetermined threshold;

the DC—DC converter is so connected as to be located between a first charge/discharge unit and a second charge/discharge unit and supplies direct-current power from one of the charge/discharge units to the other;

the switching elements include a first switching element and a second switching element;

the first switching element is connected at one end to the first charge/discharge unit and at the other end to one end of the second switching element and one end of the coil; and the coil is connected at the other end to the second charge/discharge unit.

2. The control method according to claim 1, wherein:

the DC—DC converter is so connected as to be located between a first charge/discharge unit and a second charge/discharge unit and supplies direct-current power from one of the charge/discharge units to the other;

the switching elements include a first switching element, a second switching element, a third switching element and a fourth switching element;

the first switching element is connected at one end to the first charge/discharge unit and at the other end to one end of the second switching element and one end of the coil;

the coil is connected at the other end to one end of a third switching element and one end of a fourth switching element;

the third switching element is connected at the other end to the second charge/discharge unit;

wherein if the control circuit operates the fourth switching element in the same phase as the first switching element and operates the second switching element with a 180 degree phase difference from the third switching element;

at least one of the second and third switching elements is held off while soft-start control for gradually increasing an on-duty period of the first and fourth switching elements is performed at the beginning of an operation or at least one of the first and fourth switching elements is held off while soft- start control for gradually increasing an on-duty period of the second and third switching elements is performed at the beginning of an operation.

3. The control method according to claim 2, wherein the soft-start control is terminated after a current flowing through a junction of the DC—DC converter with the second charge/discharge unit has exceeded a predetermined threshold.

4. The method according to claim 2, wherein the control circuit operates the fourth switching element in the same phase as the first switching element, operates the second switching element with a 180 degree phase difference from the first switching element and the fourth switching element, operates the third switching element being held off while soft-start control for gradually increasing an on-duty period of the first and fourth switching elements is performed at the beginning of an operation; and the control circuit operates the third switching element in the same phase as the second switching element, operates the fourth switching element with a 180 degree phase difference from the second switching element, and operates the first switching element being held off while soft-start control for gradually increasing an on-duty period of the second and third switching elements is performed at the beginning of an operation.

5. A non-isolated DC—DC converter comprising:

at least two switching elements connected to a coil; and a control circuit for performing direct-current power conversion by operating the at least two switching elements in mutually inverted phases, wherein the control circuit performs soft-start control for gradually increasing an on-duty period of one of the switching elements at the beginning of an operation and holds the other switching element off during soft-start control;

the soft-start control is terminated after a current flowing through a junction of the DC—DC converter with the first or second charge/discharge unit has exceeded a predetermined threshold;

the DC—DC converter is so connected as to be located between a first charge/discharge unit and a second charge/discharge unit and supplies direct-current power from one of the charge/discharge units to the other: the switching elements include a first switching element and a second switching element;

the first switching element is connected at one end to the first charge/discharge unit and at the other end to one end of the second switching element and one end of the coil; and the coil is connected at the other end to the second charge/discharge unit.

6. The DC—DC converter according to claim 5, wherein at least one of the switching elements is a MOS transistor equipped with a body diode.

7. The DC—DC converter according to claim 5, wherein:

the DC—DC converter is so connected as to be located between a first charge/discharge unit and a second charge/discharge unit and supplies direct-current power from one of the charge/discharge units to the other;

the switching elements include a first switching element, a second switching element, a third switching element and a fourth switching element;

the first switching element is connected at one end to the first charge/discharge unit and at the other end to one end of the second switching element and one end of the coil;

the coil is connected at the other end to one end of a third switching element and one end of a fourth switching element;

the third switching element is connected at the other end to the second charge/discharge unit;

the wherein if control circuit operates the fourth switching element in the same phase as the first switching element and operates the second switching element with a 180 degree phase difference from the third switching element;

at least one of the second and third switching elements is held off while soft-start control for gradually increasing an on-duty period of the first and fourth switching elements is performed at the beginning of an operation or at least one of the first and fourth switching elements is held off while soft- start control for gradually increasing an on-duty period of the second and third switching elements is performed at the beginning of an operation.

8. The DC—DC converter according to claim 7, wherein the soft-start control is terminated after a current flowing through a junction of the DC—DC converter with the second charge/discharge unit has exceeded a predetermined threshold.

9. The DC—DC converter according to claim 8, wherein at least one of the switching elements is a MOS transistor equipped with a body diode.

10. The DC—DC converter according to claim 7, wherein the control circuit operates the fourth switching element in the same phase as the first switching element, operates the second switching element with a 180 degree phase difference from the first switching element and the fourth switching element, operates the third switching element being held off while soft-start control for gradually increasing an on-duty period of the first and fourth switching elements is performed at the beginning of an operation; and the control circuit operates the third switching element in the same phase as the second switching element, operates the fourth switching element with a 180 degree phase difference from the second switching element, and operates the first switching element being held off while soft-start control for gradually increasing an on-duty period of the second and third switching elements is performed at the beginning of an operation.

11. The DC—DC converter according to claim 5, wherein the soft-start control is terminated after a current flowing through a junction of the DC—DC converter with the second charge/discharge unit has exceeded a predetermined threshold.

12. The DC—DC converter according to claim 11, wherein at least one of the switching elements is a MOS transistor equipped with a body diode.

* * * * *